United States Patent [19]

Deshpande et al.

[11] Patent Number: 5,717,853
[45] Date of Patent: Feb. 10, 1998

[54] INFORMATION HANDLING SYSTEM HAVING ROUTER INCLUDING FIRST MODE FOR CONFIGURING ITSELF, SECOND MODE FOR CONFIGURING ITS CONNECTED DEVICES AND THIRD MODE FOR SYSTEM OPERATION

[75] Inventors: Sanjay Raghunath Deshpande; Frank Eliot Levine, both of Austin, Tex.

[73] Assignee: International Business Machines Corporation, Armonk, N.Y.

[21] Appl. No.: 546,875

[22] Filed: Oct. 23, 1995

[51] Int. Cl.⁶ .................................... G06F 13/00
[52] U.S. Cl. ............ 395/200.1; 395/800; 395/828; 395/284
[58] Field of Search ................. 395/828, 830, 395/834, 835, 836, 837, 838, 839, 858, 800, 700, 500, 600, 650, 200.1, 200.15, 284

[56] References Cited

U.S. PATENT DOCUMENTS

| | | | |
|---|---|---|---|
| 4,466,060 | 8/1984 | Riddle | 395/200.15 |
| 4,852,015 | 7/1989 | Doyle, Jr. | 364/491 |
| 5,125,081 | 6/1992 | Chiba | 395/284 |
| 5,146,606 | 9/1992 | Grondalski | 395/800 |
| 5,261,096 | 11/1993 | Howarth | 395/200.15 |
| 5,309,437 | 5/1994 | Perlman et al. | 370/401 |
| 5,345,556 | 9/1994 | Zapisek | 395/200.15 |
| 5,361,334 | 11/1994 | Cawley | 395/200.15 |
| 5,361,373 | 11/1994 | Gilson | 395/800 |
| 5,377,327 | 12/1994 | Jain et al. | 395/200.15 |
| 5,404,451 | 4/1995 | Nemirovsky et al. | 395/200.15 |
| 5,483,661 | 1/1996 | Yoshida et al. | 395/800 |

Primary Examiner—Moustafa M. Meky
Attorney, Agent, or Firm—George E. Clark; Jenkens & Gilchrist; Anthony V. S. England

[57] ABSTRACT

A distributed information handling system includes one or more processing units, a memory system including one or more memory modules, one or more routers, one or more terminal devices an N port switch which connects selected processing units to selected memory modules and to the terminal devices through the one or more routers, where device configuration is controlled by a configuration routine running in a primary processing unit, and which configures all configurable devices in the system in a tree structured manner, each device being configured with respect to a nearest neighbor in the tree.

9 Claims, 4 Drawing Sheets

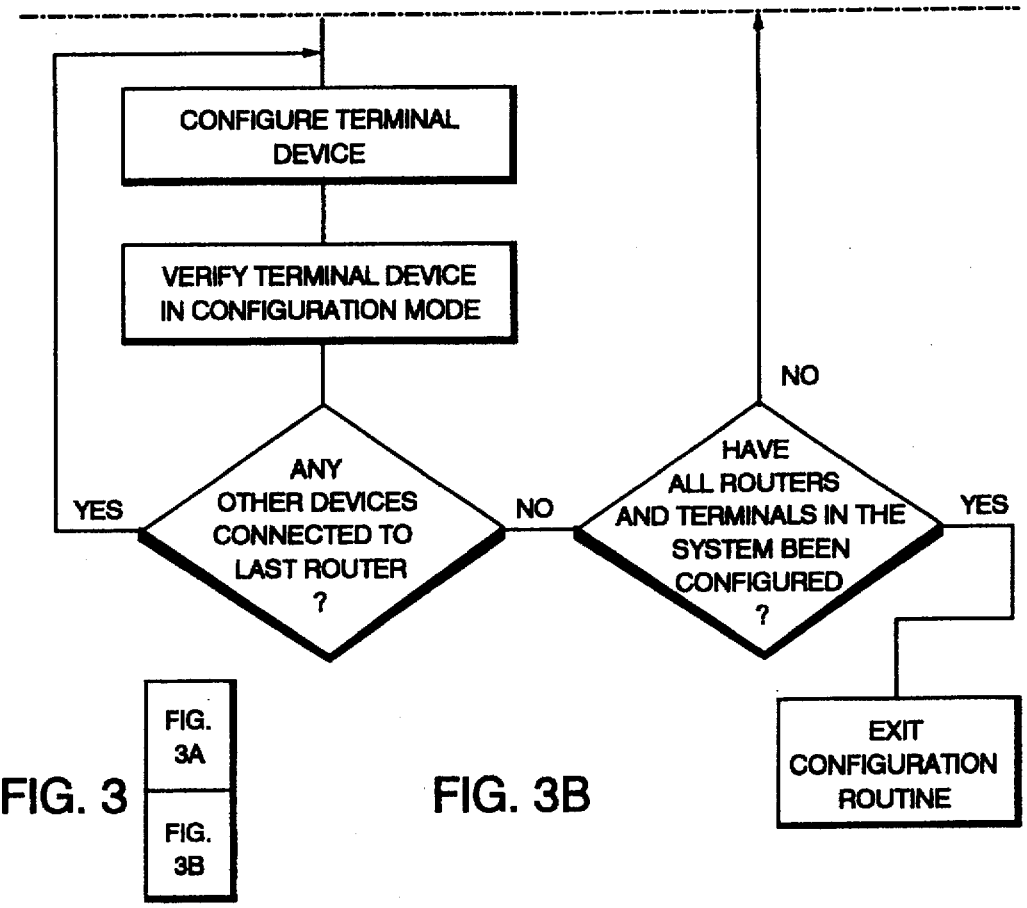
FIG. 3
FIG. 3A / FIG. 3B
FIG. 3B
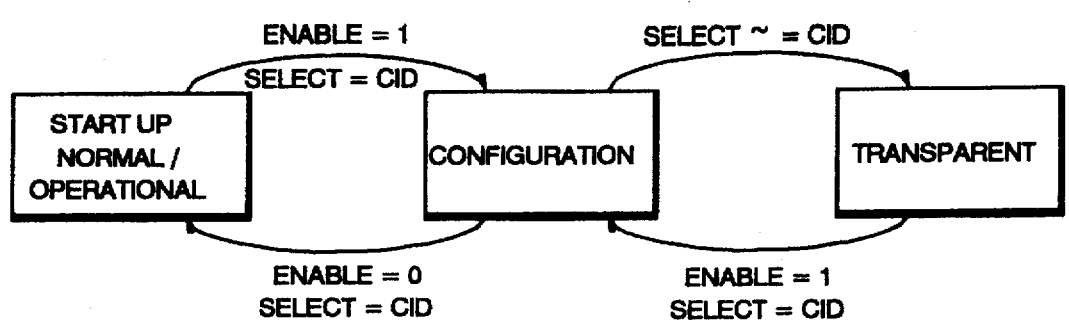
FIG. 4

5,717,853

INFORMATION HANDLING SYSTEM HAVING ROUTER INCLUDING FIRST MODE FOR CONFIGURING ITSELF, SECOND MODE FOR CONFIGURING ITS CONNECTED DEVICES AND THIRD MODE FOR SYSTEM OPERATION

BACKGROUND OF THE INVENTION

1. Field of the Invention

The present invention relates to information handling systems, and more particularly to distributed information handling systems including computer program product and method for configuring devices.

2. Prior Art

In the prior art there are many techniques for configuration of devices in a distributed information handling system. Among these techniques is a serial register scan technique, in which configuration data is read from a storage device containing "power on" configuration data to a number of registers which store the configuration address information during operation of the system. This prior art technique is inherently slow and inefficient.

Another prior art technique is a hardware intensive mechanism which selects a device to be configured, writes configuration data to configuration registers in the device, where there is a direct connection between a configuration hardware mechanism external to each device and the devices. These direct connections are expensive in packaging, wiring, and chip real estate. Systems which implement the architecture described in "RISC System/6000 PowerPC System Architecture" edited by Frank Levine and Steve Thurber, published by Morgan Kaufman Publishers, Inc. 1994, typically would employ the hardware intensive configuration technique described above.

The following are examples of prior art patents generally relating to configuring devices in information handling systems.

U.S. Pat. No. 5,146,606 is an example of a prior art patent relating to interconnection systems having the ability to configure memory modules through the use of mode signals. Mode signals accompanying messages control configuration of and access to particular memory modules in a memory system.

Although the patent generally relates to configuration of elements in a distributed memory system, the patent does not teach nor suggest the invention taught and claimed herein.

U.S. Pat. No. 4,466,060 shows an adaptor distributed message routing algorithm that may be implemented in a computer program to control routing of data messages in a packet message switching digital computer network. Network topology information is exchanged only between neighbor nodes in the form of minimum spanning trees, referred to as exclusionary trees. An exclusionary tree is formed by excluding the neighbor node and its links from the tree. From the set of exclusionary trees received a route table and transmitted exclusionary trees are constructed.

Although the patent generally describes control of message routing in a distributed computer system, the patent does not teach nor suggest a system configuration method and product as is taught and claimed herein.

U.S. Pat. No. 5,345,556 teaches a router circuit for selectively connecting an input terminal of the router circuit to either a specified output terminal or to any of a group of output terminals so the router circuit associated with a single output channel.

The patent deals specifically with router circuits and does not teach nor suggest a configuration method and product as is taught and claimed herein.

U.S. Pat. No. 5,377,327 teaches method and apparatus for operating a digital communications network to avoid congestion by detecting load conditions at routers exceeding their knee capacity, flagging information packets associated with those streams of traffic accounting for more than their fair share of throughput at such overloaded routers and reducing at the end of systems the throughput of those streams of traffic for which more than a predetermined fraction of information packets received by the end systems are flagged.

Although the patent generally deals with congestion avoidance in computer networks, the patent does not teach nor suggest a configuration method and product as is taught and claimed herein.

U.S. Pat. No. 5,261,096 shows a distribution data system having several network management systems each for managing system components in a portion of a geographical area, the system including a number of workstations at which administrative commands for configuring or monitoring the network may be entered, each network management system, and each workstation hosting a number of software processes, a method is provided of routing messages processes as a function of the name and the portion of the geographical area in which it has effect. The method facilitates reconfiguring network managing systems to take over the functions of a failed network management system in a manner transparent to operators and administrators at workstations.

Although the patent generally shows a technique for reconfiguring networks, the patent does not teach nor suggest the method and product as taught and claimed herein with reference to the present invention.

U.S. Pat. No. 5,309,437 shows a device and method for coupling systems of an extended local area network in such a way that message traffic employing internetwork protocols such as TCP/IP will be handled without the difficulties usually associated with bridges, and without the complexity and expense of full internet protocol router capability.

Although the patent generally relates to network bridges and routers, the patent does not teach nor suggest a method and product as taught and claimed herein with respect to the present invention.

U.S. Pat. No. 5,404,451 shows a method for selecting a most cost-efficient configuration for backbone links in a distributed data network. The method identifies candidate links between pairs of backbone nodes, evaluates the effect on the network of adding each candidate link to the network and adds to the network those candidate links which produce a cost savings in the network. The method also routes data through the backbone to minimize transmission delays, and eliminates redundant lines from under-utilized links, and removes from the network those links whose removal reduces the cost of the backbone.

Although the patent generally deals with configuration of links in a distributed data network, the patent does not teach nor suggest the method and product has taught and claimed herein with respect to the present invention.

SUMMARY OF THE INVENTION

Therefore, it is an object of the present invention to configure all devices in a distributed information handling system by a computer program product and method which traverses the system with a configuration routine employing system dependent configuration data to reduce configuration time.

Accordingly, a distributed information handling system includes one or more processing units, a memory system including one or more memory modules, one or more devices, a communications medium for connecting said processing units to one or more of said memory modules and to said devices, and means for controlling device configuration including a configuration routine running in a first processing unit, and a system topology data structure which comprises configuration data for each configurable device in the system.

It is an advantage of the present invention that a complex information handling system having a large number of routers and terminals can be efficiently configured in much less time or with much less hardware than prior art configuration techniques.

It is another advantage of the present invention that the scalability of the technique allows the invention to be used effectively with small systems and can be scaled to work effectively with large systems.

It is yet another advantage of the present invention that the invention works efficiently with various system topologies, such as, bus based or switch based.

Other features and advantages of the present invention will become apparent in the following detailed description of the preferred embodiment of the invention taken in conjunction with the accompanying drawing.

BRIEF DESCRIPTION OF THE DRAWINGS

FIGS. 3, 3A, and 3B are flow charts of the method and computer product in accordance with the present invention.

FIG. 4 is a state diagram of the method and computer program product in accordance with the present invention.

DETAILED DESCRIPTION OF A PREFERRED EMBODIMENT OF THE INVENTION

Figure 1:
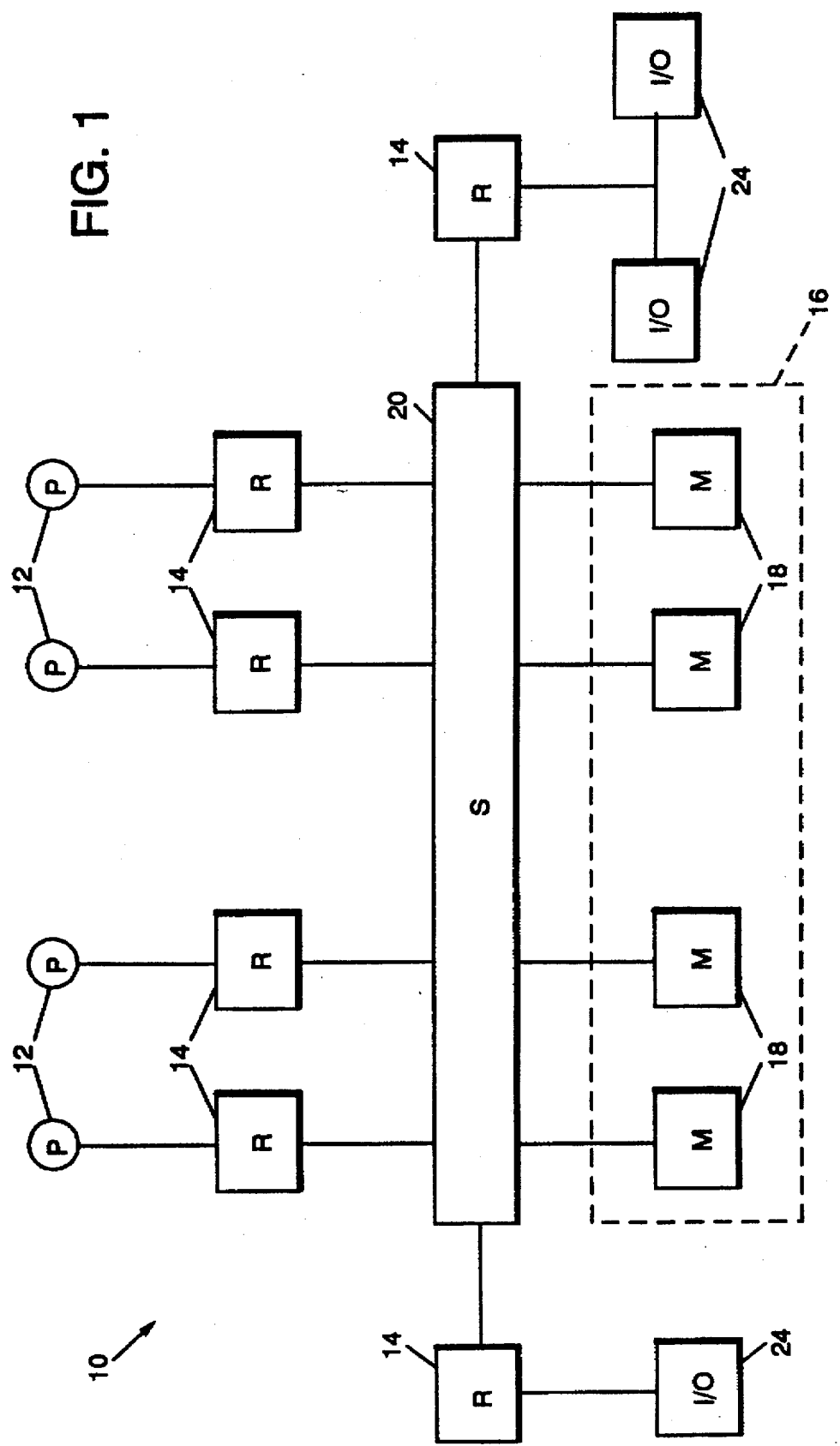
FIG. 1 is a block diagram of an information system implementing the present invention.

Many modern personal computer system designs define the architected interfaces among a set of processors, memory cards, I/O adapters, and other components during a system configuration. System configuration is an integral part of the initial program load (IPL) process and may be re-run after IPL in response to changed system conditions.

The primary purpose of configuration architecture is to define the interface between hardware and software that allows software to identify and configure each variable component of a system. Configuration software uses component identification to allocate system resources (for example, address space, interrupt levels, etc.) to the component and communicates these allocations to the component and/or its controlling software. The configuration architecture also defines the elements that are common to components, the method of identifying each component, and the method of communicating with it.

All I/O adapters may have adapter-specific functionality defined in a read-only memory on the adapter. This simplifies configuration and eliminates the need for the system initial program load read-only memory to keep adapter-specific data.

Device Configuration Architecture

An address range called the configuration address space is reserved in the real address map for selecting and configuring devices. In a typical environment, configuration space is divided into two areas: the first is the address space of the architected configuration registers, and the second is the address space of the device-specific configuration registers. In the architected configuration register area are contained the following registers: reset register, configuration register, and the architected registers for device configuration.

Each device shall have a unique device identifier (CID). In the preferred embodiment, a device identifier may have 9 bits.

Only one processor at a time can own a specific common system resource such as the configuration space or the boot read-only memory. A software locking mechanism prevents other processors from accessing these resources.

Architected Configuration Registers

The architected configuration registers provide a consistent interface to software regardless of the system interconnect topologies (for example, system bus, crossbar switch, ring, star, etc.) and types within topology (for example, 60X, PCI within the system bus).

Each software-configurable device implements the architected address corresponding to the Configuration Register (CR). The CR is a 32-bit register with the following definition:

| Bit 0: | Enable bit |
| Bits 23 ... 31: | Device identifier (CID) |

The device continuously listens to the load/store commands to the CR that appear on its inputs. The number of bits implemented is system specific. However, bits in the reset register shall be implemented contiguously starting at bit 0 of the lowest address. When a bit in the reset register is set to 0, the corresponding device is forced into a reset state. When a bit in the reset register is a 1, the device is no longer in the reset state. After power on, the bits in the reset register identify the state of each device. Devices having corresponding bits in the reset register equal to 1 are already configured. The software writes a 1 to a bit of the reset register representing an unconfigured device to allow the device to be configured, one bit at a time. The software reads the reset register to determine that the bit into which a 1 has been written has changed indicating the new state of the device.

The configuration software sets bit 0 to 1 and uses bits 23–31, inclusive, as a binary value to select a specific bit position of the configuration register.

When software has written a 1 into an implemented bit of any position in the reset registers, the software can configure specific devices under the control of the hardware by writing to the configuration register. There is a one-to-one correspondence between the bits of the reset register and the CID field of the configuration register.

Each device responds to accesses in the device specific configuration address range only when it is selected for configuration.

Configuration Sequence

After completion of a hardware initialization sequence, control is passed to software which may perform further configuration.

Devices that have been configured are identified by the appropriate bits in the reset register as described above.

Devices that have not yet been configured are configured by the configuration software.

Referring now to FIG. 1, an information handling system implementing the present invention will be described.

An information handling systems 10 includes one or more processing units 12, one or more routers 14 and a memory system 16 which includes one or more memory units 18. Each processing unit 12 is connected to a router 14 which provides a connection to the remainder of information handling system 10 through a network switch 20. One or more groups of processor units 12, routers 14, memory units 18 and switches 20 may be connected to form a larger information handling system 10. One or more terminal devices 24 are connected to switch 20 through routers 14. Each router 14 connected to terminal devices 24 may connect more than one terminal device 24 to switch 20.

Memory system 16 is partitioned into a number of address segments, where at least one of the segments is allocated to each of the memory units 18. Also, there is a system I/O address space in which each terminal device 24 has allocated thereto a segment of the total address space. Terminal device 24 may be implemented as an I/O controller.

Each of the units identified above are well known in the art and will not be described in greater detail herein.

Figure 2:
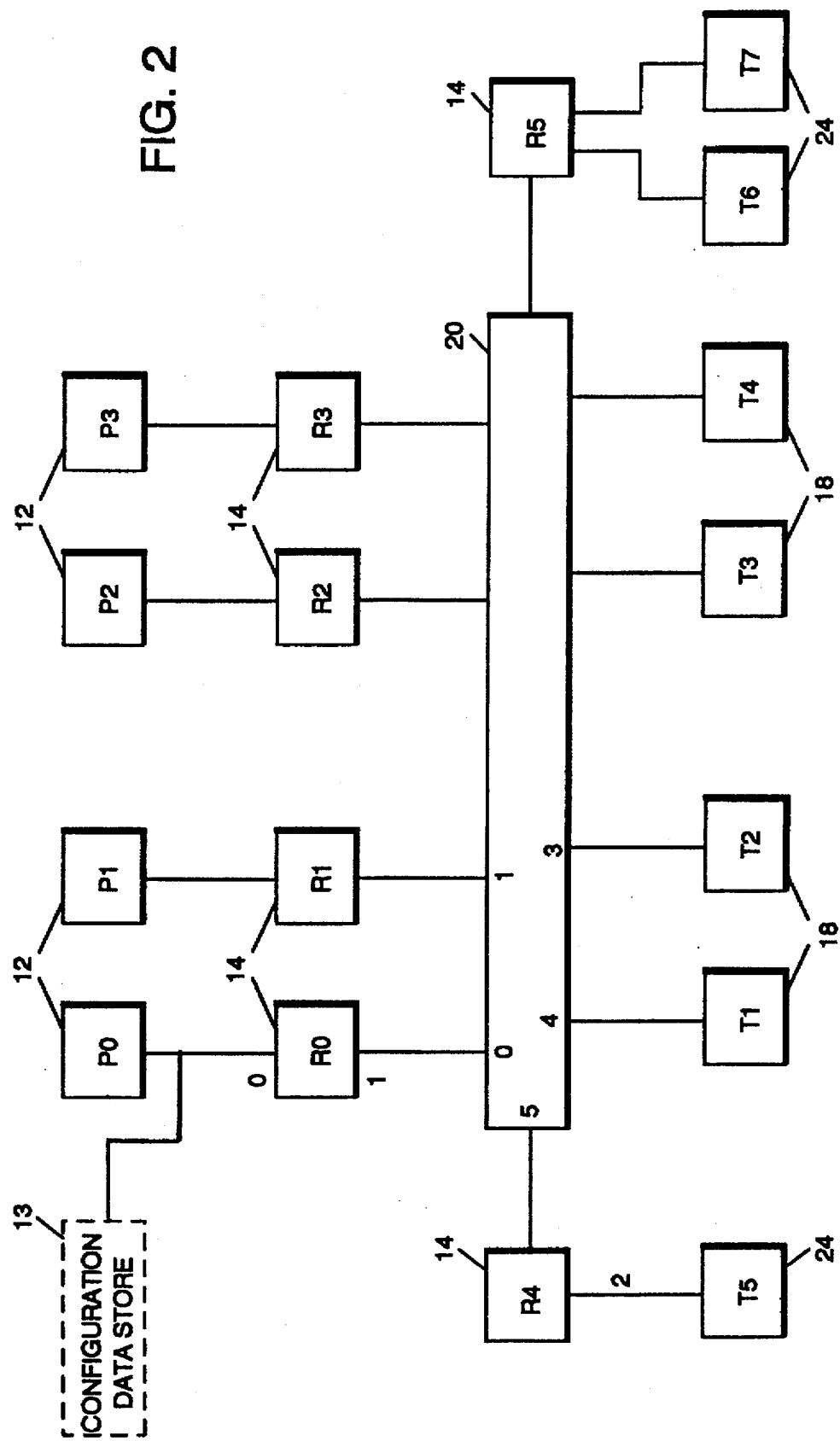
FIG. 2 is a system block diagram showing configuration structure in accordance with the present invention.
Figure 3A:
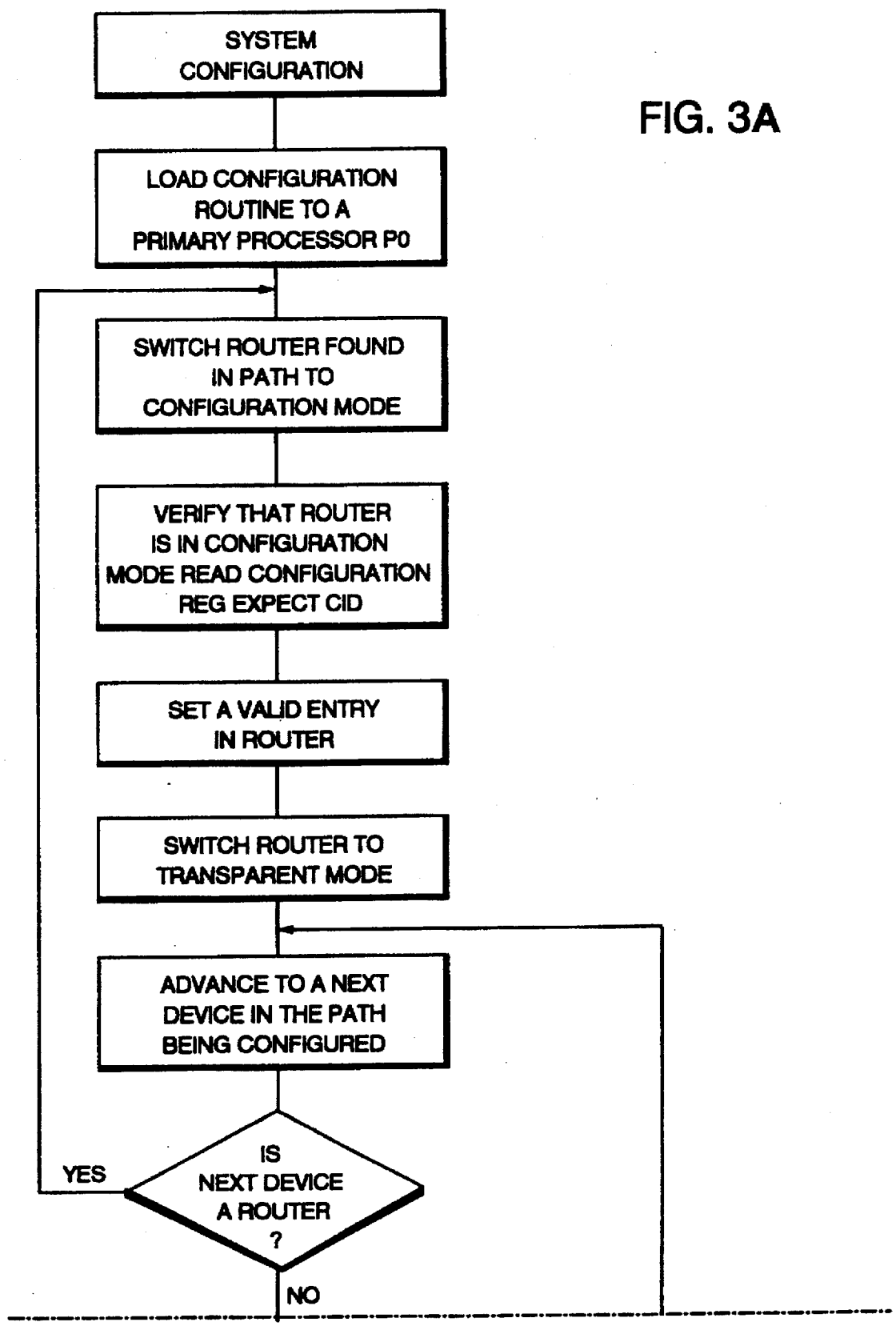

Referring now to FIGS. 2 and 3, the configuration technique in accordance with the present invention will be further described.

One of processors 12, for example, P0, is designated as the primary processor which will control device configuration in accordance with the present invention. A device must be removed from reset state to be configured.

Configuration data and system topology data for each device will be accessed by processor P0 from configuration data storage 13.

Processor P0 then begins to run the configuration routine which assigns path information to each router or device in each path through the system 10. For example, P0, loads a routing entry to router R0 for routing of accesses. Router R0 is switched to configuration mode and a first path is configured. Once a first path through router R0 is configured, router R0 is switched to a transparent mode and the configuration routine proceeds to a next device in the path being configured. For example, if the communications medium or switch 20 connects an output of R0 at port 0 of the communications medium 20 to router R4 through port 5 of communications medium 20, the next device in the path to be configured is router R4. Router R4 is placed in configuration mode and configuration data is passed to router R4 from processor P0 through router R0. Router R4 is then switched to transparent mode and the next device in the path, T5, a terminal device, is then placed in configuration mode, configuration data is passed to the terminal device T5 to configure T5 and T5 is then switched to operation mode. The system topology data structure (see example below) is then examined to determine whether any other terminal devices or any other routers are connected to R4 in the path being configured. If not, R4 is then switched to operation mode and another path from an output of router R0 is then considered. In this way, configuration data is passed in configuration mode to all devices T1, T2, T3, T4, T5, T6 and T7 connected to communications medium 20 or routers R0, R4, and R5. After configuration of any terminal device TN, the terminal device is switched from configuration mode to operational mode and the associated router is switched from transparent mode to operational mode, assuming that there is no other terminal device attached to the same router which requires configuration. Routers R1, R2 and R3 are all configured in turn as paths are created from primary processor P0 to processors P1, P2, and P3 through routers R0, R1, R2 and R3 and communications media 20.

Referring to FIG. 3, the method according to the present invention will be described with reference to the flow chart of the configuration routine.

When system configuration mode is entered, the configuration routine is accessed by primary processor P0 from the configuration data storage or system firmware (not shown). The first router found in the path to be configured is switched to configuration mode, the configuration mode is verified by reading the configuration register and testing for the Device identifier (CID) of the router, and a valid entry is set in the router if configuration mode has been verified. The router is then switched to transparent mode and the next device in the path is then examined. If the next device is a router, the previous router is switched to transparent mode and the routine loops back to provide configuration data to the next router found in the path. If the next device is not a router, the device is a terminal device which is then configured. If there are other devices connected to the same router, the routine loops back and the next terminal device is configured. When all terminal devices connected to a router have been configured, the terminal devices are switched to operation mode and the system topology data structure is then examined to determine whether all routers and terminals in the system have been configured. If not, the routine next advances to the next device in the system and the above steps are repeated until all routers and terminals in the system have been configured, at which point the configuration routine is exited and all routers and other devices in the system are in operation mode fully configured.

It is assumed that each device in the system will be assigned a unique device identifier (CID) during power-up. This CID is utilized during the configuration process to select a device and to put it in the desired state.

A device exists in one of three modes: Configuration, Transparent, and Operational.

Mode transitions for the device are effected by writes to the CR.

FIG. 4 shows the state transitions caused by writes to the CR presented to the device.

To configure a device, the software writes to the CR with the identifier of the device (CID) in Bits 23..31 and 1 in the enable bit. This sends the device into the configuration mode. In the following is specified device behavior in various modes:

Configuration: Device maps addresses in a device specific configuration address range and intercepts all reads and writes in that range. (For all addresses outside this range, the device behaves as in Operational Mode described below.)

Once a device thus enters the configuration mode, its internal Configuration Registers and Device-Dependent Configuration Registers (DCRs) become visible in the of the device specific address range.

In this mode, the device responds with its own CID to a Read of CR.

While the device is in configuration mode, if it receives a write to the CR with enable bit set and with a CID other than the device's own, the device transitions into the transparent mode.

Transparent: This state is specifically relevant to routers. Routers pass accesses made in a predetermined address range using validated routing entries. The write to the CR that transferred the device into the transparent mode is also passed on if a valid routing entry exists for the CR address. However, the write to CR transferring the device into configuration mode is not passed on even if a valid routing entry would have required it to forward the access.

If a valid entry does not exist, a device ignores the accesses other than Writes to the CR with its own CID and Enable=1.

Operational: Routers route accesses using validated routing entries. A router only respond to addresses which the routing entries specifically indicate as existing within it: CR is always implemented. In this mode, the device responds with its own CID to a Read of CR. If a valid routing entry does not exist, the action is undefined (i.e., it may ignore the accesses).

In the operational mode, non-routing devices simply respond to architected addresses implemented within them.

FIG. 4 shows the state transitions for the device as a result of writes to the CR. The writes differ in values for the Enable bit and the CID.

The following system topology data structure is an example of data structures used in router and device configuration in accordance with the present invention.

```
Sample System Topology Data Structure

Interconnects:
    struct interconnect {
    int interconnect_id;
    short interconnect_type;   /* 0=bus, 1=switch                  */
    short num_port;            /* bus-># of devices on the bus */
    i_port_entry *port_entry_ptr;  /* points to the list          */
    }
    struct i_port_entry {
    i_port_entry *next;
    short icn_port_id
    short cid;                 /* Configuration ID                 */
    }
Devices:
    struct device{
    int cid;
    int dev_type;              /* Type of device                   */
                               /* Bit 0 = 0 => router              */
                               /* Bit 0 = 1 => non-router           */
                               /* Bits 2-23 - Reserved - 0         */
                               /* Bits 24-31 - Subtype             */
                               /* 0=prim. processor (0x8000)       */
                               /* 1=non-primary processor          */
                               /* (0x8001)                         */
                               /* 2=Device type 1 (0x0002),        */
                               /* 3=Device type 2 (0x0003)         */
    short num_port;
    d_port_entry *port_entry_ptr
    }
    struct d_port_entry{
    d_port_entry *next;
    short device_port_id       /* physically connected port        */
    short far_entity_type;     /* 0=non-router (terminal)          */
                               /* 1=router                         */
                               /* 2=interconnect                   */
    int far_entity_id          /* cid or interconnect id           */
    short far_entity_port_id   /* entity's port conn. to           */
```

The following table shows the assignment of bit positions for the configuration routing register in accordance with the present invention.

TABLE 1

| Bit | Description |
|---|---|
| 0 | Validity Indicator<br>0 - Not Valid<br>1 - Valid |
| 1-10 | Reserved |
| 11-15 | out_port_id |
| 16-23 | Reserved |
| 24-31 | system_specific_routing_info |

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A distributed information handling system, comprising:
   one or more processing units;
   a memory system including one or more memory modules;
   one or more devices;
   a communications medium for connecting said processing units to one or more of said memory modules and to said devices;
   means for controlling device configuration comprising a configuration routine running in a first processing unit, and a system topology data structure which comprises configuration data for each configurable device in the system; and
   one or more routers, wherein each of said routers has a first mode of operation for configuration of said router, a second mode of operation for configuration of devices connected to said router, and a third mode of operation for system operation.

2. A distributed information handling system, according to claim 1, further comprising means for detecting a state change in a device between a reset state and a non reset state.

3. An information handling system, comprising:
   a communications medium
   one or more processors;
   a first group of one or more routers, each connected to one of the processors and to the communications medium;
   a second group of one or more routers, each connected to the communications medium;
   a memory system having a number of units, each unit of the memory system connected to the communication medium;
   one or more devices each connected to one of the second group of one or more routers; and,
   means associated with one of the processors for configuring each device in the information handling system, the configuring means comprising:
   means for determining a device type for each device;
   if a device type is determined to be a router, means for switching the router to a configuration mode and setting a valid routing entry;
   means for switching the router to a transparent mode;
   means for advancing to a next device in a path being configured; and
   means for switching the next device to configuration mode, configuring the next device and switching the next device to operation mode.

4. An information handling system, according to claim 3, wherein said communications medium comprises a system bus.

5. An information handling system, according to claim 3, wherein said communications medium comprises an N port switch.

6. A method for configuring devices in a distributed information handling system, comprising the steps of:
   loading a configuration routine from a predetermined storage location to a preselected processing unit;
   testing a next device in a path to be configured for device type;
   if a next device is a router, first switching said router to a configuration mode;
   setting a valid entry in said router;
   second switching said router to a transparent mode and advancing to a next device in said path
   if said next device is a terminal device, configuring said terminal device and determining if any other terminal devices are connected to a router to which said terminal device may be connected.

7. A method for configuring devices in a distributed information handling system, according to claim 6, further comprising the steps of:
   repeating said steps of testing, first switching, setting a valid entry, second switching and configuring for said next device in said path until all devices in said system have been configured.

8. A method for configuring devices in a distributed information handling system according to claim 6, further comprising the steps of:

configuring a next terminal device connected to the same router, if any;

configuring the router; and switching the terminal device and the router to operation mode.

9. A method for configuring devices in a distributed information handling system according to claim 6, further comprising the steps of:

detecting a state change in a device between a reset state and a non reset state.

* * * * *